United States Patent [19]

Liu

[11] Patent Number: 5,781,684
[45] Date of Patent: Jul. 14, 1998

[54] SINGLE MODE OPTICAL WAVEGUIDE HAVING LARGE EFFECTIVE AREA

[75] Inventor: Yanming Liu, Horseheads, N.Y.

[73] Assignee: Corning Incorporated, Corning, N.Y.

[21] Appl. No.: 770,394

[22] Filed: Dec. 20, 1996

[51] Int. Cl.⁶ ........................................ G02B 6/18
[52] U.S. Cl. .......................... 385/124; 385/126; 385/127
[58] Field of Search ................................ 385/124, 123, 385/125, 126, 127, 128, 141, 142

[56] References Cited

U.S. PATENT DOCUMENTS 5,649,044  7/1997  Bhagavatula ........................... 385/124
5,659,649  8/1997  Nouchi et al. ........................... 385/124
5,684,909  11/1997  Lui ........................................ 385/127

*Primary Examiner*—Phan T. H. Palmer
*Attorney, Agent, or Firm*—William J. Chervenak

[57] ABSTRACT

A single mode optical waveguide having large effective area is disclosed. The large effective area is achieved by using a segmented core profile design which includes at least one segment, or a part of one segment, having a refractive index less than the minimum refractive index of the clad layer. The large effective area serves to reduce or eliminate detrimental non-linear optical waveguide effects which limit regenerator spacing and bit rate. The large effective area is achieved while maintaining bend resistance at least as good as that of standard step index single mode waveguide fiber.

19 Claims, 7 Drawing Sheets

5,781,684

SINGLE MODE OPTICAL WAVEGUIDE HAVING LARGE EFFECTIVE AREA

BACKGROUND

The invention relates to a single mode optical waveguide fiber for telecommunications having a large effective area, $A_{\it eff}$. A single mode waveguide, having a large effective area, will have reduced non-linear optical effects, including self phase modulation, four wave mixing, cross phase modulation, and non-linear scattering processes. Each of these effects causes degradation of signal in high power systems.

The scattering processes, which degrade signal, are in general described by an equation containing a term $\exp(cP/A_{\it eff})$, where c is a constant P is signal power. The other non-linear effects are described by equations which include the ratio, $P/A_{\it eff}$ as a multiplier. Thus, an increase in $A_{\it eff}$ produces a decrease in the non-linear contribution to the degradation of a light signal.

The requirement in the telecommunication industry for greater information capacity over long distances, without regenerators, has led to a reevaluation of single mode fiber index profile design.

The focus of this reevaluation has been to provide optical waveguides which:

reduce non-linear effects such as those noted above;

are optimized for the lower attenuation operating wavelength range around 1550 nm;

are compatible with optical amplifiers; and, retain the desirable properties of optical waveguides such as low attenuation, high strength, fatigue resistance, and bend resistance.

Previous studies, such as that disclosed in U.S. patent application Ser. No. 08/378,780 (Abandoned), have started from the basic concepts of segmented core design first introduced in U.S. Pat. No. 4,715,679, Bhagavatula. Larger effective area waveguides were discovered for a class of core designs disclosed in the Ser. No. 08/378,780 (Abandoned) cited above. A particular design incorporating at least one core region having a minimum index below that of the clad was disclosed in that application.

Further study of core index profile designs, having regions of refractive index lower than the minimum clad refractive index, uncovered two key characteristics of waveguide fibers having very large effective area. The first characteristic is that the mode power distribution weighted by radius, i.e., $E^2 \times r$, where E is electric field and r is radius, has the distinctive character of being at least bi-modal which when charted against radius. A bi-modal mode power distribution may occur as a double peak or as a peak having an adjacent flattened shoulder. It will be understood that the mode power distribution is determined by the guiding structures incorporated in the refractive index profile of the waveguide. Refractive index profiles are known which produce more complex mode power distribution characteristics than a bi-modal distribution. The novel, very large effective area waveguide is also characterized by an $A_{\it eff}$ to $A_{\it mf}$ ratio, (see definitions below), greater than 1.3.

Using these keys, the model, which predicts properties for segmented core designs, was used to generate a family of core designs having an $A_{\it eff}$ a mode power distribution (or electric field intensity distribution), and a ratio of effective area to mode field area ratio which characterizes waveguide fiber suitable for use in the very highest performance telecommunications systems.

Definitions

The effective area is $A_{\it eff}=2\pi(\int E^2 \, r \, dr)^2/(\int E^4 \, r \, dr)$, where the integration limits are 0 to $\infty$, and E is the electric field associated with the propagated light.

An effective diameter, $D_{\it eff}$, may be defined as, $D_{\it eff}=2(A_{\it eff}/\pi)^{1/2}$ The mode field area $A_{\it mf}$ is $\pi(D_{\it mf}/2)^2$, where $D_{\it mf}$ is the mode field diameter measured using the Peterman II method wherein, $2w=D_{\it mf}$ and $w^2=(2 \int E^2 \, r \, dr/\int |dE/dr|^2 \, r \, dr)$, the integral limits being 0 to infinity.

The ratio $R=A_{\it eff}/A_{\it mf}$

An alpha profile is $n=n_o(1-\Delta(r/a)^\alpha)$, where $n_o$ is the greatest refractive index of the alpha index profile, $\Delta$ is defined above, r is radius, and a is the radius measured from the first to the last point of the alpha index profile. One may chose r to be zero at the $n_o$ point of the alpha index profile or the first point of the profile may be translated a selected distance from the waveguide centerline. An alpha profile having alpha equal to 1 is triangular. When alpha is two the index profile is a parabola. As the value of alpha becomes greater than 2 and approaches 6, the index profile becomes more nearly a step index profile. A true step index profile is described by an alpha of infinity, but an alpha of about 4 to 6 is a step index profile for practical purposes.

The width of an index profile segment is the distance between two vertical lines drawn from the respective beginning and ending points of the index profile to the horizontal axis of the chart of refractive index vs. radius.

The % index delta is

% $\Delta=[(n_1^2-n_c^2)/2n_1^2]\times 100$, where $n_1$ is a core index and $n_c$ is the clad index. Unless otherwise stated, $n_1$ is the maximum refractive index in the core region characterized by a % $\Delta$.

The zero reference for refractive index is chosen as the minimum refractive index in the clad glass layer. A region of refractive index in the core which is less than this minimum value is assigned a negative value.

A refractive index profile in general has an associated effective refractive index profile which is different in shape. An effective refractive index profile may be substituted, for its associated refractive index profile without altering the waveguide performance. See reference, *Single Mode Fiber Optics*, Marcel Dekker Inc., Luc B. Jeunhomme, 1990, page 32, section 1.3.2.

Bend performance is defined by a standard testing procedure in which the attenuation induced by winding a waveguide fiber about a mandrel is measured. The standard is a measurement of attenuation increase of a waveguide fiber having a bend of one turn about a 32 mm mandrel or having bends of 100 turns about a 75 mm mandrel. The maximum allowed bending induced attenuation is usually specified in the operating window around 1300 nm and around 1550 nm.

An alternative bend test is the pin array bend test which is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm. center to center. The pin diameter is 0.67 mm. During testing. sufficient tension is applied to make the waveguide fiber conform to a portion of the pin surface.

SUMMARY OF THE INVENTION

The present invention meets the need for very high performance optical waveguide fiber by effectively solving those problems introduced by non-linear waveguide effects and by the introduction of optical amplifiers into the telecommunications system design.

This need is met by providing a single mode optical waveguide fiber having very high effective area while still maintaining bending performance at least comparable to that of standard single mode step index waveguide fiber. Also, attenuation must be low enough to allow long regenerator spacing and required fiber strength and fatigue resistance must be maintained.

In particular. in the standard 32 mm mandrel. single loop bending test. the embodiments presented below have an induced loss. due to bending. equal to or less than 0.05 dB at 1550 nm measurement wavelength. Likewise. in the 100 loop. 75 mm mandrel test, the bend induced attenuation is equal to or less than 0.05 dB at 1310 nm and equal to or less than 0.10 dB at 1550 nm. These results are equivalent to those for standard step index fiber.

Thus a first aspect of the invention is a single mode optical waveguide fiber having a core with at least three distinct segments. The segments are distinguished from each other by the refractive index profile defined over a particular radius interval. The features which provide large effective area without sacrificing bend performance are:

the presence in the core of at least one segment having a portion of its refractive index less than the minimum refractive index of the clad; and.

at least two segments having a portion of their refractive indexes greater than the maximum index of the clad.

Although the field power is distributed over a greater core area, the presence of the combination of positive and negative refractive index core portions serves to guide the transmitted light well enough to meet bending loss requirements.

In general. the inventive fiber. having at least three distinct core portions and at least one core portion having negative refractive index. has the characteristics:

attenuation is comparable to that of standard step index single mode waveguide fiber;

bending loss is less than or equal to that of standard step index single mode waveguide fiber;

the weighted field distribution is at least a bi-modal distribution as shown, for example, by curve 24 in FIG. 4;

the effective area is greater than 90 microns$^2$ in the 1550 nm operating window and can be made to exceed 350 microns$^2$ in that window; and, the ratio $R=A_{\mathit{eff}}/A_{\mathit{mf}}$ is greater than about 1.3 and can be made to exceed 3.7. The 1550 nm operating window in general includes a wavelength range of about 1530 nm to 1565 nm.

A family of preferred embodiments of this first aspect have a core containing four or five distinct refractive index segments. In each of these embodiments, two non-adjacent segments have a negative refractive index. Each segment is characterized by a refractive index $\Delta\%$, and a width measured along a waveguide fiber radius.

The segments may then be described in terms of the shape of the refractive index profile. the index $\Delta\%$ and segment radius measured from the zero radius point at the waveguide center to the final point in each core segment. The widths of each segment are found from the differences in radii. For example. if $a_o$ is the radius drawn to the last point of the first core segment and $a_1$ is the radius drawn to the last point of the second core segment. then $a_1-a_o$ is the width of the second segment.

In a five segment embodiment, each of the segments has a refractive index profile which is essentially a step. i.e.. each segment is characterized by a constant refractive index. Due to diffusion of dopant during fabrication of the waveguide core. the corners of the step are rounded. In general. a small amount of rounding does not impact waveguide fiber performance. In cases where the rounding is significant. a mathematical description of the rounded index profile is entered into the model used to calculate properties of a particular segmented core waveguide.

A significant discovery made in analyzing embodiments of the novel refractive index profile is that the centerline refractive index profile. i.e.. the first core region segment. may have a variety of shapes, as illustrated by lines 8 and 6 in FIG. 1. while maintaining desired waveguide performance. In general. a particular waveguide refractive index profile portion has an associated equivalent refractive index profile. See the definitions above. It will be understood that disclosing and claiming a particular refractive index profile shape. includes the associated equivalents, in the disclosure and claims.

A particular set of ranges of index $\Delta\%$ and widths for the four and five segment core are given herein. However, it will be understood that there are essentially an infinite number of profiles which provide the required $A_{\mathit{eff}}$, R value. and field distribution. One may take a functional core design and make adjustments in width or segment placement or segment refractive index profile or index $\Delta\%$ without moving the key waveguide properties outside the specified target ranges. It will. therefore. be understood that the family of acceptable core designs given herein include those closely related designs which provide the specified waveguide fiber functionality.

In each of the embodiments described below, whenever a $\Delta\%$ is assigned. the clad layer is taken to have an essentially constant refractive index of $n_c$.

A family of optical waveguides, having a four segment core. has been found which has exceptionally high $A_{\mathit{eff}}$ and good bend resistance and is characterized by:

a first core segment. beginning at the waveguide fiber centerline. having an alpha profile and a $\Delta_o\%$ in the range of about 0.7% to 1.2% and $a_o$ in the range of about 1.5 to 3.5 microns, a second adjoining core segment having a $\Delta_1\%$ less than of about −0.10% and $a_1$ in the range of about 6.5 to 11 microns, a third core segment having a $\Delta_2\%$ in the range of about 0.3% to 0.8%, and $a_2$ in the range of about 7.5 to 14 microns, a fourth core segment having a $\Delta_3\%$ less than about −0.10% and $a_3$ in the range of about 10 to 32 microns, and, radius a less than about 35 microns.

A preferred member of this four segment core family has the parameters:

$\Delta_o\%$ in the range of 0.65% to 1.0%;

$a_o$ in the range of about 2.8 microns to 3.5 microns;

$\Delta_1\%$ less than about $-0.10\%$;

$a_1$ in the range of about 6 to 8 microns;

$\Delta_2\%$ in the range of about 0.50% to 0.85%;

$a_2$ in the range of about 8 to 10 microns;

$\Delta_3\%$ less than about $-0.10\%$;

$a_3$ in the range of about 13 to 16 microns; and, the radius a about equal to $a_3$.

The lower limit on negative $\Delta\%$ segments is essentially set by process capability rather than waveguide fiber performance requirements. At present, levels of about $-0.8\%$ can be achieved.

The alpha profile describes triangular shapes, i.e. alpha=1, parabolic shapes, alpha=2, and a continuum of curves which begin to approximate a step when alpha is in the range of 4 or more. The alpha profile may have an index depression, in the shape of an inverted cone, on its centerline. The model has sufficient flexibility to accommodate such a depression.

A preferred embodiment of a core region having a four segment index profile is illustrated in FIG. 11 and characterized by:

$\Delta_1\%$ in the range of about 0.65% to 1.00%;

$r_1$ equal to 3.35 +/−0.30 microns;

$\Delta_2\%$ less than about $-0.10\%$;

$r_2$ equal to 7.2 +/−0.60 microns;

$\Delta_3$ in the range of about 0.50% to 0.85%;

$r_3$ equal to 9.1 +/−0.70 microns;

$\Delta_4$ less than about $-0.10\%$;

$r_4$ equal to 14.5 +/−1.0 microns. The definitions of these profile parameters are given below.

In the case of the five segment core region refractive index profile, a family of profiles is defined as follows:

beginning at the waveguide center and proceeding outward, a first core segment has a $\Delta_o\%$ in the range of about 0 to 0.20% and a radius, as measured from the center line of the optical waveguide, in the range of about 0.50 to 1.50 microns;

a second core segment has $\Delta_1\%$ in the range of about 0.5% to 1.2%, and a radius $a_1$ in the range of about 0.5 to 4.5 microns, a third core segment has $\Delta_2\%$ less than about $-0.1\%$ and $a_2$ in the range of about 6 to 12 microns, a fourth core segment has $\Delta_3\%$ in the range of about 0.2% to 0.8%, and $a_3$ in the range of about 7 to 16 microns, a fifth core segment has $\Delta_4\%$ less than about $-0.1\%$ and $a_4$ in the range of about 13 to 26 microns, and, the core radius, a, in the range of about 25 to 35 microns. In many of the preferred embodiments, the core radius coincides with the outside radius of the final core segment.

Optical waveguides having core refractive index profiles which are described by this family of profiles can have effective areas greater than 350 microns$^2$ and bend resistance superior to that of standard step index waveguides, without significant degradation of attenuation or other performance characteristics such as strength or fatigue resistance.

In the five segment embodiment described immediately above, the first segment may take on a variety of shapes, such as the shape of an alpha profile, without markedly affecting the waveguide properties. Also, the alpha profile may include a central depression in refractive index in the shape of an inverted cone. This central depression can result either from control of doping during fabrication of a preform or from control of dopant diffusion out of the preform during fabrication.

A third embodiment of the inventive core refractive index is a waveguide having a core characterized by three negative refractive index segments:

a first core segment having $\Delta_o\%$ less than about $-0.10\%$, and $a_o$ in the range of about 0.1 to 2.5 microns;

a second core segment having $\Delta_1\%$ in the range of about 0.5% to 1.2%, and $a_1$ in the range of about 0.5 to 4.5 microns;

a third core segment having $\Delta_2\%$ less than about $-0.1\%$, and $a_2$ in the range of about 6 to 12 microns, a fourth core segment having $\Delta_3\%$ in the range of about 0.2% to 0.8%, and $a_3$ in the range of about 7 to 14 microns, a fifth core segment having a $\Delta_4\%$ less than about $-0.1\%$, and $a_4$ in the range of about 13 to 30 microns, and, the core radius, a, in the range of about 20 to 35 microns.

The choice of which of these embodiments is preferred is dictated by considerations of ease of manufacture, the related manufacturing cost and the ability of the design to consistently yield the target $A_{\mathit{eff}}$ and bend resistance.

For most purposes two index depressions in the four segment design using an alpha profile on center and step index profiles in the remaining core segments is most cost and performance effective. The five segment design using step index profiles in all segments may be preferred in some cases.

It is clear that many permutations and combinations of these segmented core designs are possible. Thus, it is understood that these particular embodiments show members of a family of index profiles. The scope of the invention includes this family of index profiles.

A characteristic which is sought in the modelling, and which generally assures a superior waveguide core design, is that the distribution of mode power weighted by radius is at least bi-modal. Mode power is proportional to the square of the propagated electric field. In a preferred embodiment, the model is used to discover those core designs in which the bi-modal power distribution is a curve having two peaks.

An embodiment in which the first mode power maxima occurs at a radius between 0 and 5 microns and the second at a radius greater than 8 microns, provides a waveguide fiber having large $A_{\mathit{eff}}$ and bend resistance at least as good as that specified for standard step index waveguide fiber.

DETAILED DESCRIPTION OF THE INVENTION

The investigation of properties of specific segmented core designs has continued to keep pace with an ever increasing demand for high capacity, long haul waveguide fiber. Data rates in the terrabit range are being studied and systems having regenerator spacings greater than 100 km are under consideration.

Previous work, e.g., patent application Ser. No. 08/378,780, suggested that designs, which include a core segment having a refractive index lower than that of the clad, should be studied further because they could yield optical waveguide fibers having large effective area.

The discovery disclosed in this application is that, in fact, effective areas, much greater than any previously reported, are possible in designs incorporating at least one core segment having a refractive index lower than that of the clad. Further, the inventive core design confines the launched light sufficiently well to provide an large $A_{\mathit{eff}}$ waveguide with no degradation in bend resistance relative to standard step index single mode fiber. In many of the designs, the large $A_{\mathit{eff}}$ waveguides are superior in bending performance compared to standard step index single mode.

Figure 1:
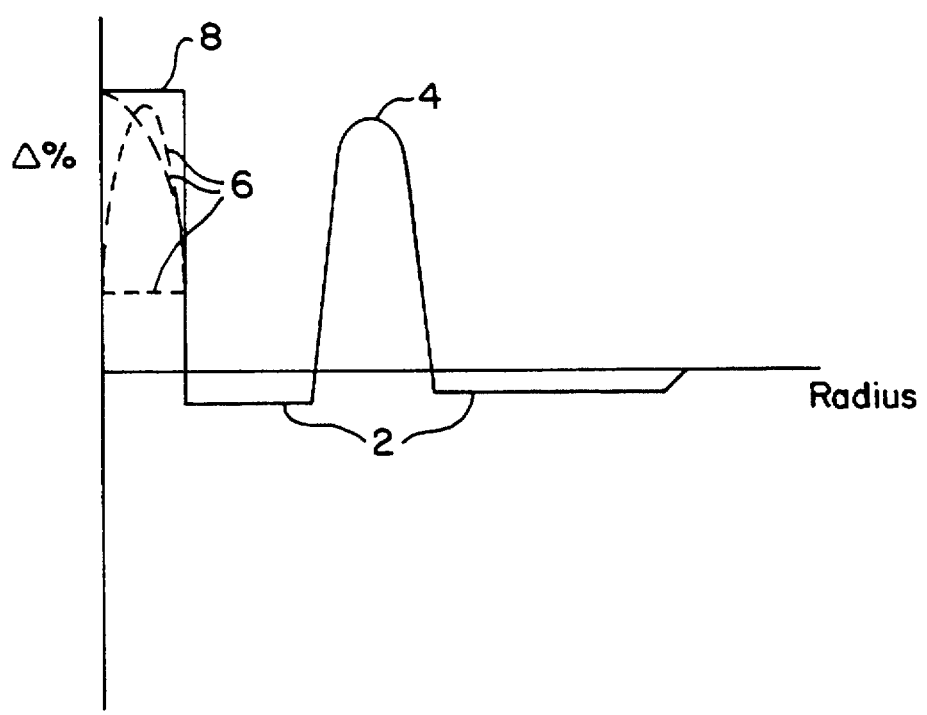
FIG. 1. is an illustration of a core refractive index profile having four segments, two of the segments having a refractive index less than that of the clad layer.

A general embodiment of the inventive core refractive index profile is shown in FIG. 1. The core is comprised of four refractive index segments, first segment 8, third segment 4, having a rounded step index shape, and the two regions, 2, having an index lower than the refractive index of the clad. Dashed curves 6 in the first segment indicate other possible shapes for the first segment index profile. Segment 4, also can have a variety of shapes without significant impact on the waveguide fiber properties. The low index profile segments 2 may be different from each other in terms of width and minimum refractive index. Also, segments 2 may have a slight positive or negative slope and may be somewhat rounded in shape. The lower limit on the Δ% for segments 2 depends upon process capability. Delta percent values of about –0.80% provide a waveguide having the specified properties.

The effect of this profile on propagated light is to confine a portion of the propagated power in the first segment defined by 8 and the adjoining low index region 2. A second portion of the light power is guided by the structure 4 together with the outside region 2 of low refractive index. The large $A_{\mathit{eff}}$ is the result of structure 4 guiding power away from the waveguide center. Bending resistance is not sacrificed because light confinement is provided by the outer low index region 2.

Figure 2:
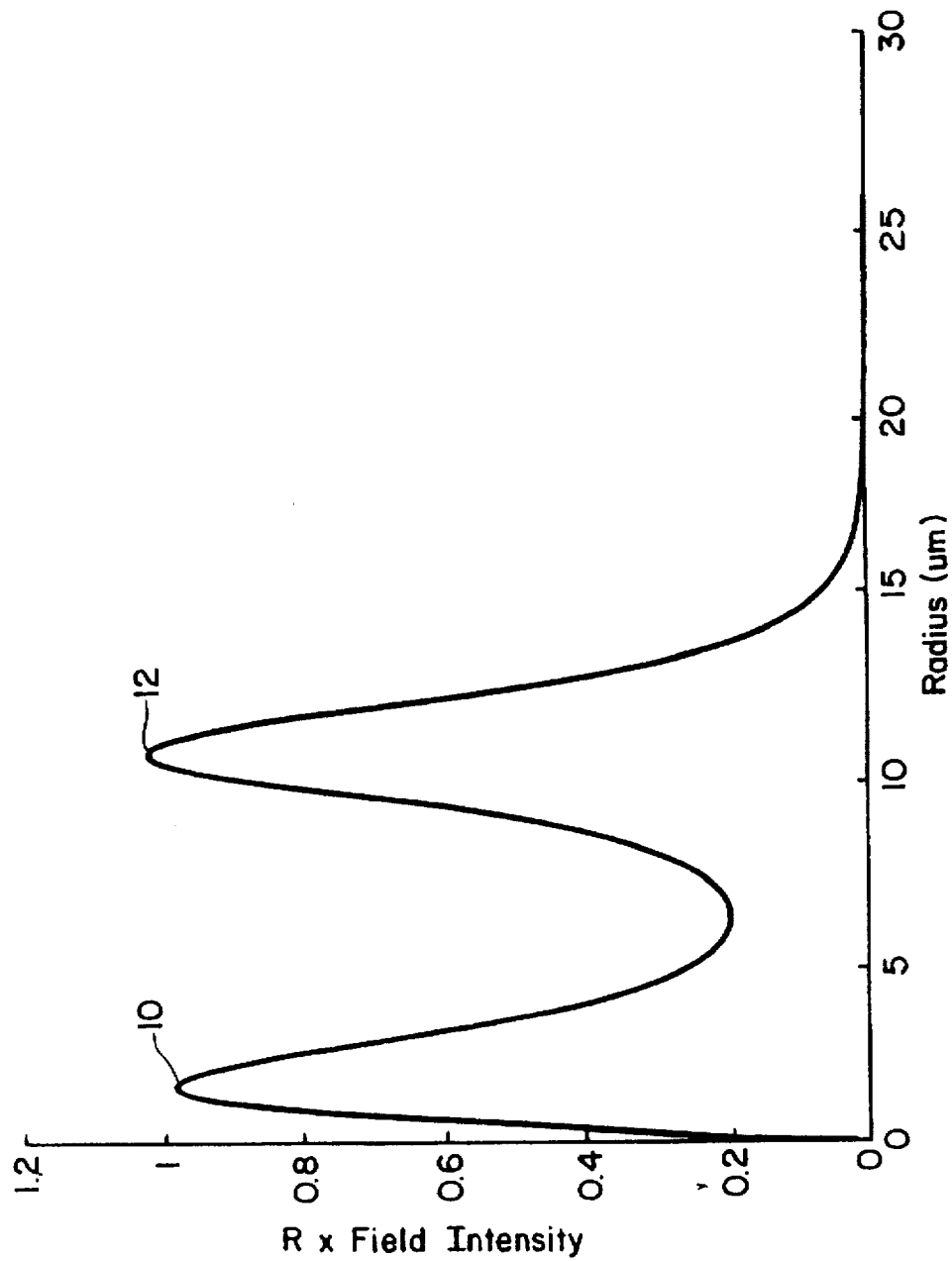
FIG. 2. is a chart of weighted field intensity vs. radius for a representative embodiment of the novel core refractive index profile.

The bi-modal power distribution of a four segment embodiment of the novel segmented core design is shown in FIG. 2, which is a chart of weighted field intensity as a function of radius. The inner peak 10 corresponds to the first segment guiding structure of the segmented core. Peak 12 corresponds to the guiding structure located nearer the core periphery. The amplitude of peak 12 falls off sharply as radius increases, ensuring that the light is well confined and that bending resistance will be good.

Figure 11:
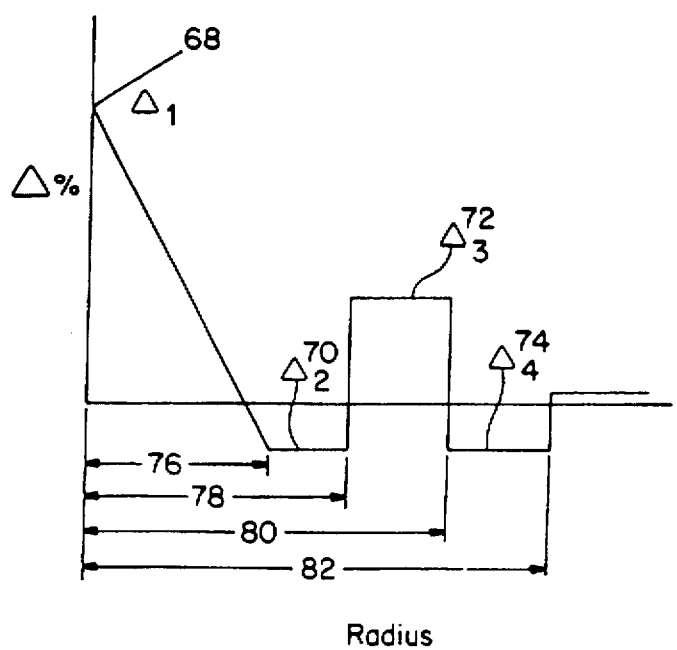
FIG. 11. is an illustrative refractive index profile having four segments, which shows the definitions of the index profile Δ's and the radii used in the model.

The definitions of the refractive index profile Δ's and radii are illustrated in FIG. 11. In the four segment embodiment shown in FIG. 11, the respective positions of $\Delta_1\%$, $\Delta_2\%$, $\Delta_3\%$, and $\Delta_4\%$ are 68, 70, 72, and 74. The respective radii of the four segments used in the model calculations are all measured from the waveguide fiber centerline and are shown in FIG. 11 as 76, 78, 80, and 82. These or analogous definitions of Δ% and radius are used in all model calculations.

The particular modelled properties associated with FIG. 2 are, $A_{\mathit{eff}}$=210 microns$^2$ and cut off wavelength, measured on the fiber, of 1562 nm. In a cabled structure, the cut off wavelength usually decreases by 200 nm to 400 nm. Thus, in terms of cut off wavelength, the modelled fiber is suited for high performance systems in either the 1310 nm or the 1550 nm window.

Figure 3:
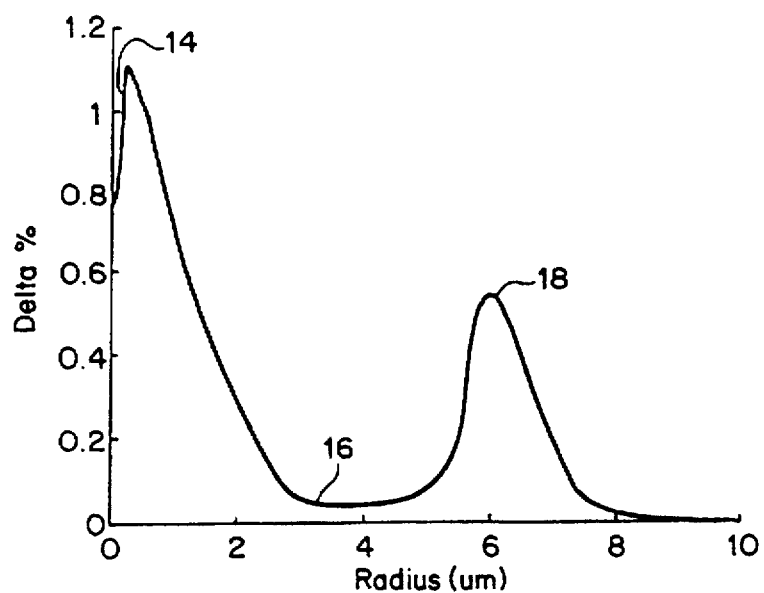
FIG. 3. is a segmented core refractive index profile for which modeled parameters were compared to parameters measured on a waveguide fiber having this index profile.

The model has been tested for accuracy by comparing actual to predicted waveguide fiber properties. The refractive index profile shown in FIG. 3 is an actual waveguide fiber profile having a center alpha profile 14, a reduced index region 16 and a rounded step index ring 18. Note the diffusion region on the waveguide centerline. The model takes into account this inverted cone shaped, centerline refractive index depression. Table 1 shows the excellent agreement between model and actual waveguide fiber properties, with the exception of a 200 nm offset between actual and model cut-off wavelength. Given the dependence of cut-off wavelength on the physical disposition of the waveguide during measurement, this difference is regarded as acceptable. Although the example index profile shown in FIG. 3 does not include segments having a negative Δ%, the example nonetheless shows the general accuracy of the model for the family of index profiles disclosed herein.

|           | Cut-Off Wavelength | Disp. Slope | Disp. Zero | MFD microns | Bend dB |
|-----------|--------------------|-------------|------------|-------------|---------|
| Measured  | 1700 nm            | 0.122       | 1538 nm    | 10.0        | 8.4     |
| Predicted | 1900 nm            | 0.120       | 1539 nm    | 10.2        | 4.6     |

Figure 4:
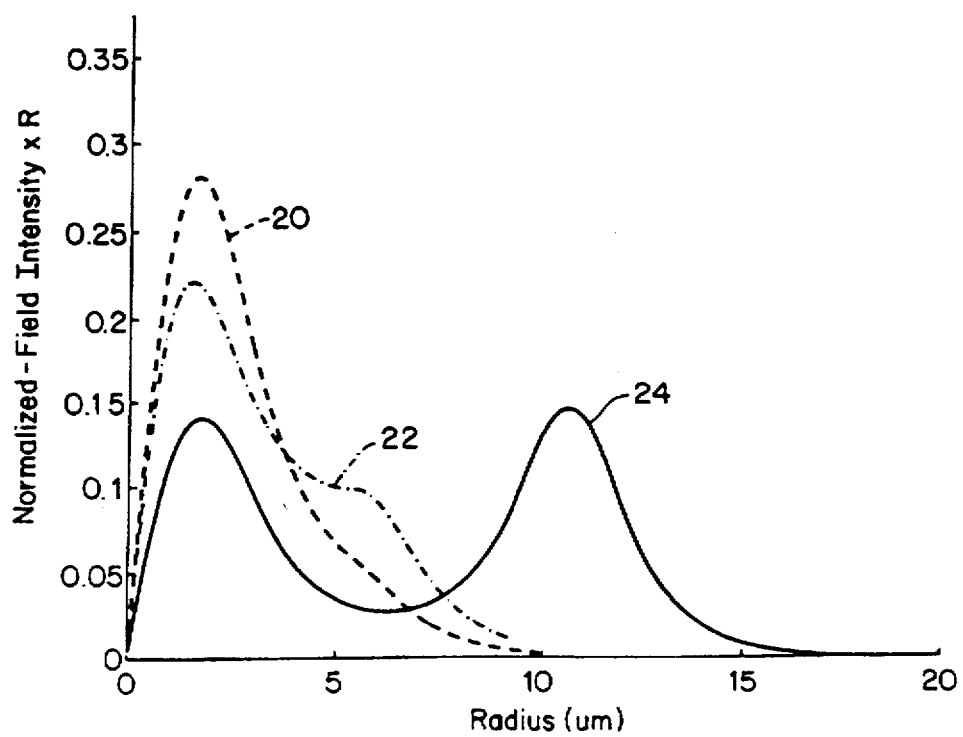
FIG. 4. is a chart of weighted field intensity for three segmented core waveguide types.

A characteristic weighted field intensity pattern of the novel core design is shown as curve 24 in FIG. 4. The double peaked pattern is clearly distinct from that of standard dispersion shifted fiber shown as curve 20 in FIG. 4. The standard dispersion shifted waveguide fiber index profile design includes a first segment having an alpha profile, a ring of flat index profile having a refractive index close to that of the clad layer, and a second ring having a rounded step index shape.

The category of large effective area designs disclosed in U.S. patent application Ser. No. 08/378,780 has a characteristic weighted field intensity illustrated by curve 22. As expected these designs do show a weighted field intensity pattern having a region shifted outward towards larger radius.

Figure 10:
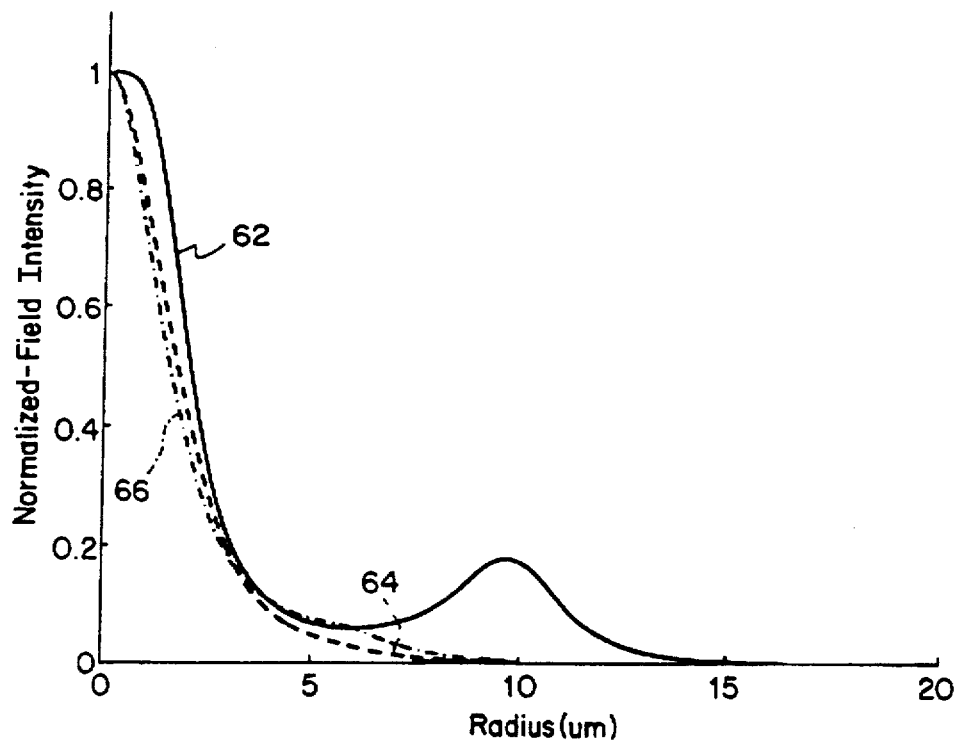
FIG. 10. is a chart of field intensity vs. radius for a representative embodiment of the inventive core refractive index profile.

For completeness, the field intensities of these three distinct core profile designs are shown in FIG. 10. Curve 64 is the field intensity of the standard dispersion shifted waveguide fiber, curve 66 is the field intensity for the design of patent application Ser. No. 08/378,780, and curve 62 is the field intensity characteristic of the large effective area designs of the present invention. The double peaked curve 62 is quite distinct from the curves characteristic of the other two designs.

Figure 5A:
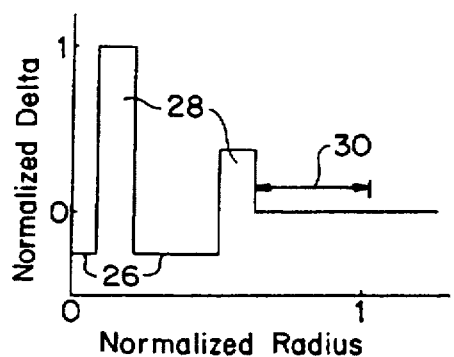
FIG. 5a, 5b, 5c. is an illustration of a core refractive index profile having five segments, two of the segments having a refractive index less than that of the clad layer.
Figure 5B:
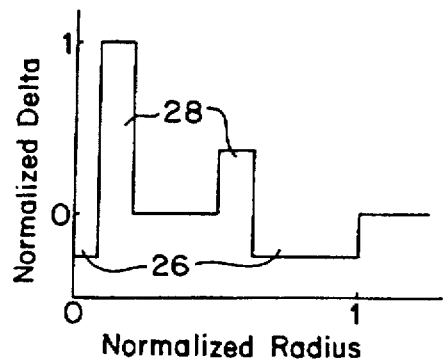
Figure 5C:
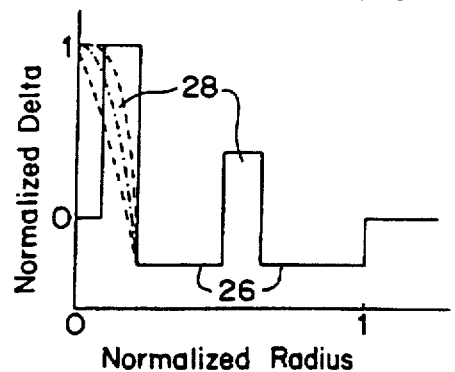

Refractive index profile design options having two regions of index profile lower than the clad refractive index are shown in FIGS. 5a, 5b & 5c. Each of the illustrations shows two low refractive index regions 26 and two step or rounded step index regions 28. The FIG. 5a design includes a core region 30 which matches the clad refractive index.

The preferred embodiment from among these three index profiles is illustrated in FIG. 5c. The two low refractive index regions are located away from the first segment of the core region. Thus, the field distribution is moved away from the waveguide center, thereby increasing the effective area. The low index ring at the core region periphery serves to confine the propagated light, in the waveguide, to provide acceptable bend resistance.

Alternative first segment profiles are shown in FIG. 5c as broken curves near step index profile 28. These alternatives, including those which include a diffusion depression on centerline, all yield acceptable effective areas and R ratios.

EXAMPLE 1

Dual Low Index Profile

Figure 6:
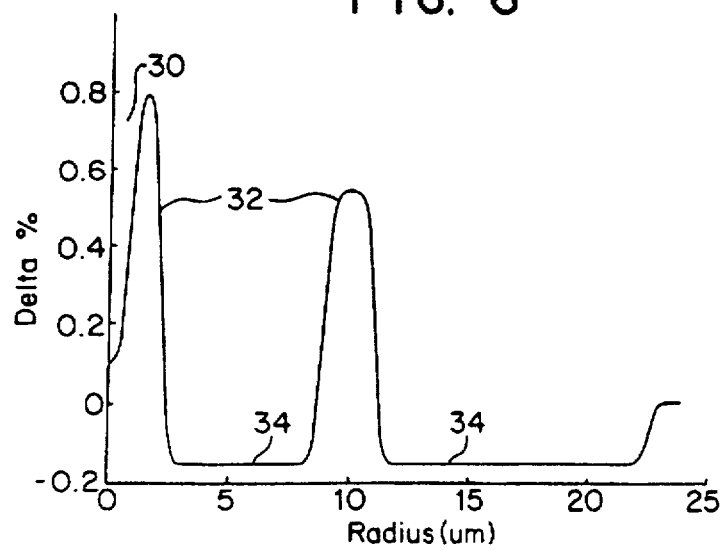
FIG. 6. is a variation of the embodiment described in FIG. 5.

Referring to FIG. 6., the modelled core region profile has a central diffusion depression, 30, resembling an inverted cone in shape, having a minimum $\Delta\%$ of about 0.18 and a maximum radius of about 1 micron. The first ring 32 is a rounded step index of maximum $\Delta\%$ 0.80 and a radius $a_o$ of about 3 microns. Low index profile segment 34, has an index $\Delta\%$ of $-0.18$ and a radius $a_1$ of about 7.5 microns. The second ring 32 is a rounded step index having a $\Delta\%$ of about 0.50 and $a_2$ of about 11 microns. Low index profile segment 34 has an index $\Delta\%$ of $-0.18$ and a radius $a_3$ of about 23 microns. The core region ends at the point where the refractive index reaches that of the clad layer, which in this case occurs at a radius of about 24 microns.

The modelled properties of this embodiment are:

Mode Field Diameter - 9.8 microns $D_{eff}$ - 18.1 microns $A_{eff}$ - 257 microns$^2$

R - 3.41

Cut-Off Wavelength - 1809 nm

Dispersion Zero - 1561 nm

Dispersion Slope - 0.151 ps/nm$^2$-km .

The bending performance is equivalent to that for standard step index single mode waveguides.

The modelled waveguide is ideal in all respects for high performance waveguide telecommunication systems operating over the range 1535 nm to 1575 nm. However, the dispersion slope should be lower for systems operating at both the 1310 nm and 1550 nm windows. One may trade off effective area for improved dispersion slope. Or, as an alternative, segmented core profiles which provide low total dispersion in the 1310 nm window, may be designed.

COMPARATIVE EXAMPLE 2

Figure 7:
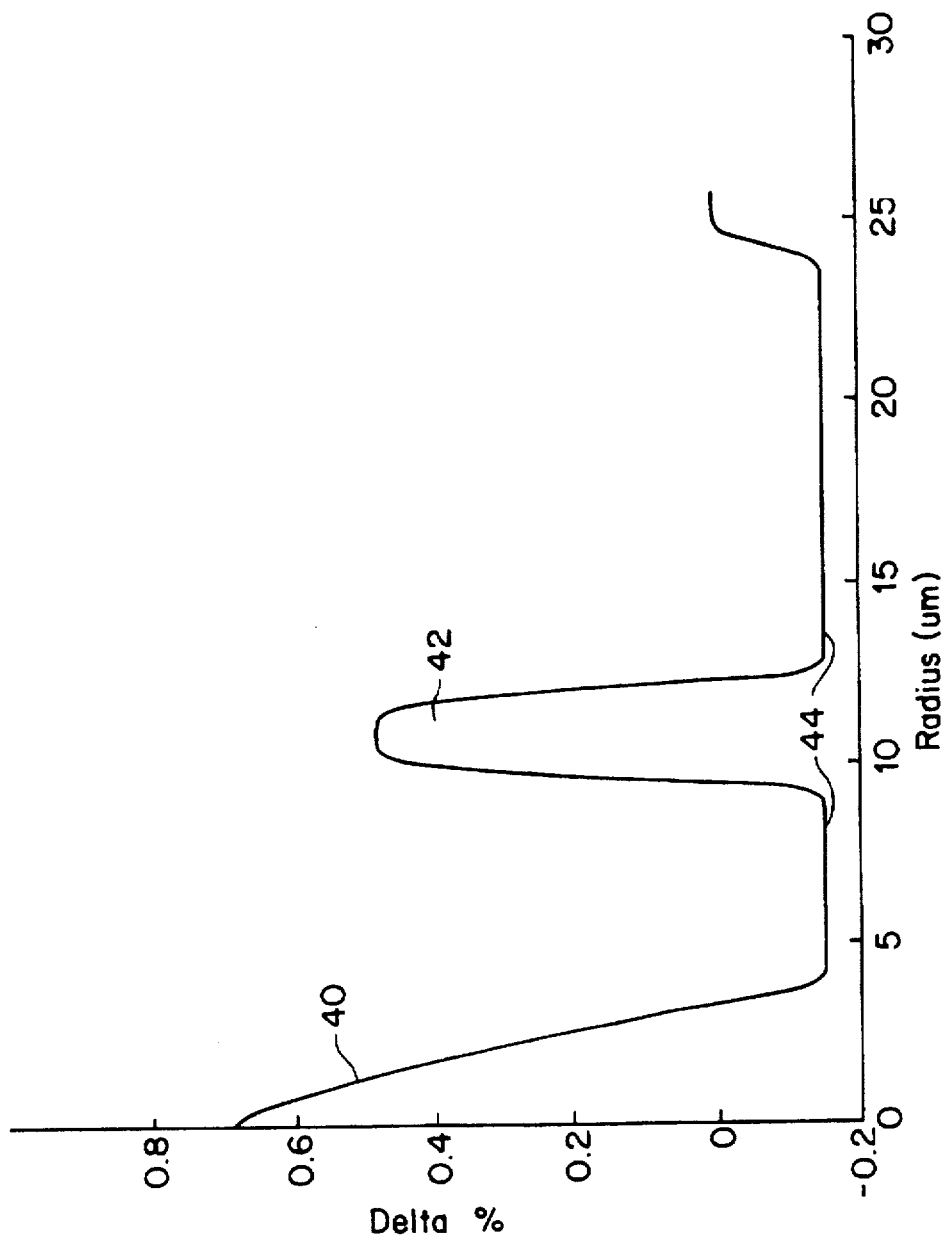
FIG. 7. is a modeled profile having four segments and a triangular first segment.

The core refractive index profile shown in FIG. 7 differs from that of FIG. 6 only in that the first segment index is triangular and has a maximum $\Delta\%$ of about 0.7, no diffusion cone on centerline and an $a_o$ of about 4 microns.

The modelled parameters are:

Mode Field Diameter - 10.0 microns $D_{eff}$ - 16.4 microns $A_{eff}$ - 210 microns$^2$

R - 2.69

Cut-Off Wavelength - 1834 nm

Dispersion Zero - 1562 nm

Dispersion Slope - 0.16 ps/nm$^2$-km.

Note that a large change in index profile near the core center has a small effect on the waveguide parameters.

Figure 8:
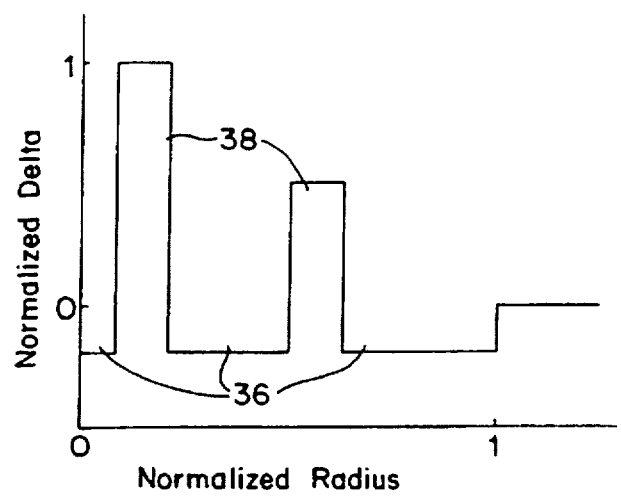
FIGS. 8, 9a–b. are modelled core refractive index profiles having five segments, three of the segments having a refractive index less than that of the clad layer.

A profile having three low index regions 36, is shown in FIG. 8. The rings 38 are shown as step index but may be rounded step index. Furthermore the first ring may be an alpha profile.

EXAMPLE 3

Three Segment Low Index Profile

Figure 9A:
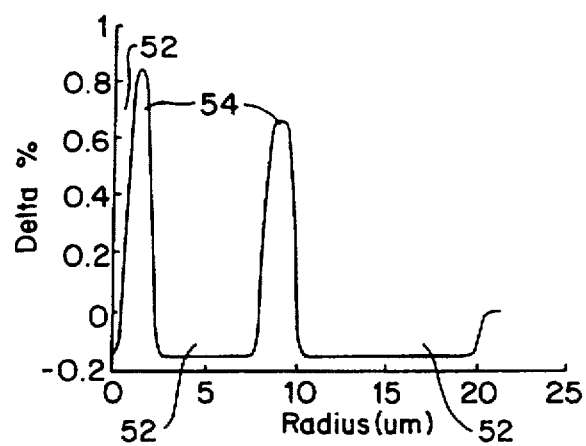

The profile of FIG. 9a includes three low index regions, i.e., regions where the refractive index is lower than that of the clad layer, 52, and two rounded step index rings 54. The first low index region is an inverted cone having a minimum $\Delta\%$ of $-0.18$ and a maximum radius of about 1 micron. Proceeding from the center, the radii and $\Delta\%$'s for the remaining core regions are, respectively, 3 microns and 0.85%, 7 microns and $-0.18\%$, 10 microns and 0.7%, and 20 microns and $-0.18\%$.

This core refractive index profile yields modelled waveguide parameters:

Mode Field Diameter - 9.65 microns $D_{eff}$ - 15.96 microns $A_{eff}$ - 200 microns$^2$

R - 2.74

Cut-Off Wavelength - 1740 nm

Dispersion Zero - 1562 nm

Dispersion Slope - 0.137 ps/nm$^2$-km.

COMPARATIVE EXAMPLE 4

Three Low Index Core Regions

Figure 9B:
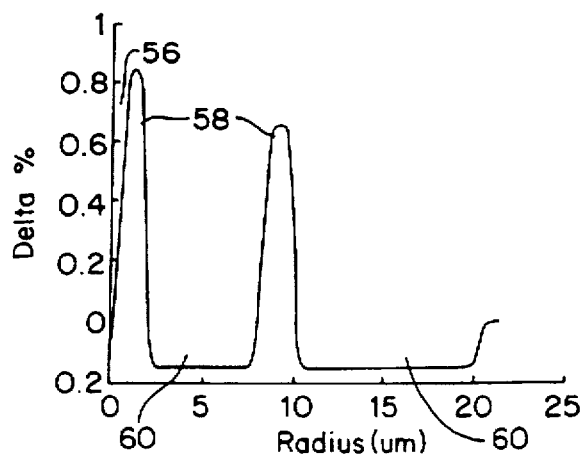

The refractive index profile of FIG. 9b is essentially identical to that of example 3 except that the width of the central diffusion inverted cone has been narrowed so that only a small portion of the centerline profile has a lower refractive index than that of the clad.

The modelled waveguide properties are:

Mode Field Diameter - 9.79 microns $D_{eff}$ - 18.42 microns $A_{eff}$ - 267 microns$^2$

R - 3.54

Cut-Off Wavelength - 1738 nm

Dispersion Zero - 1544 nm

Dispersion Slope - 0.124 ps/nm$^2$-km.

Comparing the results of the profiles of FIGS. 9a & 9b, one is led to the FIG. 9b profile as preferred, because the R ratio is higher, the cut-off wavelength is not substantially effected, and, the dispersion zero is better suited to WDM in the wavelength window 1535 nm to 1575 nm, which is essentially coincident with the erbium optical amplifier operating window.

Example 3 and comparative example 4 demonstrate clearly the need for modelling of the segmented core profiles. The number of profiles possible within the segmented core concept is essentially infinite. Thus, the most efficient and time/cost effective approach to finding a family of profiles, having a pre-determined set of properties, is to carry out a broad modelling study prior to the actual manufacture of the novel segmented core waveguide.

For the embodiment shown in FIG. 11, the profile parameter limits are given in the invention summary section. About 2500 refractive index profiles, in the core design family illustrated by FIG. 11, were modelled. The calculated waveguide properties were:

$\lambda_o$=1580 +/–30 nm;

total dispersion slope=0.085 +/–0.02 ps/nm$^2$-km;

mode field diameter=8.0 +/–0.5 microns;

$A_{eff}$=265 +/–35 microns;

$\lambda_c$=1850 +/–100 nm;

pin array bend loss average=9.6 dB; and, pin array end loss median 7.0 dB. The pin array range was 3 to 25 dB.

Although particular embodiments of the invention have been herein described and disclosed, the invention is nonetheless limited only by the following claims.

What is claimed is:

1. A single mode optical waveguide fiber having a 1550 nm operating window, comprising:

a core region having a refractive index profile, wherein the refractive index profile of said core is sub-divided into at least three segments; and, a clad layer having a refractive index profile, wherein at least a portion of said core refractive index profile is greater than at least a portion of said clad layer profile and at least one segment of said core index profile has a minimum refractive index less than the minimum refractive index of said clad layer;

said single mode optical waveguide fiber having an effective area greater than about 90 microns$^2$ in the 1550 nm operating window, and a ratio of effective area to mode power area greater than about 1.3;

thereby providing a low dispersion waveguide fiber for operation over the wavelength range 1530 nm to 1565 nm.

2. The single mode optical waveguide fiber of claim 1 wherein said core region refractive index profile is sub-divided into five segments and the minimum refractive index of two, non-adjacent segments is less than the minimum refractive index of said clad layer, and the last point, with respect to the zero reference point on the waveguide fiber centerline, in each said core refractive index profile segment is defined as a radius, $a_o$, $a_1$, $a_2$, $a_3$, and a, respectively, wherein a is the radius of said core.

3. The single mode optical waveguide fiber of claim 2 wherein the first said core segment is defined from 0, a point on the waveguide center line, to radius $a_o$, and has a constant index of $n_o$, the second said core segment has a width ($a_1$–$a_o$) and a rounded step index profile of maximum refractive index $n_1$, the third said core segment has a width ($a_2$–$a_1$) and a constant refractive index $n_2$, the fourth said core segment has a rounded step refractive index profile and a maximum refractive index $n_3$ and a width ($a_3$–$a_2$), and the fifth said core segment has a width (a–$a_3$) and a constant refractive index $n_4$.

4. The single mode optical waveguide fiber of claim 3 wherein said clad layer has a constant refractive index $n_c$, and, $n_2$ and $n_4$, are less than $n_c$.

5. The single mode optical waveguide fiber of claim 4 wherein the segments of said core are characterized by index $\Delta\%$'s, $\Delta_o\%$, $\Delta_1\%$, $\Delta_2\%$, $\Delta_3\%$, and $\Delta_4\%$, respectively, the first said core segment having $\Delta_o\%$ in the range of about 0 to 0.2%, and $a_o$ in the range of about 0.50 to 1.5 microns, the second said core segment having $\Delta_1\%$ in the range of about 0.5% to 1.2%, and $a_1$ in the range of about 0.50 to 4.5 microns, the third said core segment having $\Delta_2\%$ less than about –0.1%, and $a_2$ in the range of about 6 to 12 microns, the fourth said core segment having $\Delta_3\%$ in the range of about 0.2% to 0.8%, and $a_3$ in the range of about 7 to 16 microns, the fifth said core segment having $\Delta_4\%$ less than about –0.1%, and $a_4$ in the range of about 13 to 26 microns, and, the core radius, a, in the range of about 25 to 35 microns.

6. The single mode optical waveguide fiber of claim 3 wherein said clad layer has a constant refractive index $n_c$, and, $n_o$ and $n_2$, are less than $n_c$.

7. The single mode optical waveguide fiber of claim 3 wherein said clad layer has a constant refractive index $n_c$, and, $n_o$ and $n_4$, are less than $n_c$.

8. The single mode optical waveguide fiber of claim 1 wherein said core region refractive index profile is sub-divided into four segments and the minimum refractive index of two, non-adjacent segments is less than the minimum refractive index of said clad layer, and the last point in each said core refractive index profile segment is defined as a radius, $a_o$, $a_1$, $a_2$, and a, respectively, wherein a is the radius of said core.

9. The single mode optical waveguide of claim 8 wherein, each said core segment has a $\Delta\%$, the first said core segment having an alpha profile and a $\Delta_o\%$ in the range of about 0.7% to 1.2% and $a_o$ in the range of about 1.5 to 3.5 microns, the second said core segment having a $\Delta_1\%$ less than about –0.10%, and $a_1$ in the range of about 6.5 to 11 microns, the third said core segment having a $\Delta_2\%$ in the range of about 0.3% to 0.8%, and $a_2$ in the range of about 7.5 to 14 microns, said fourth core segment having a $\Delta_3\%$ less than about –0.10%, and $a_3$ in the range of about 10 to 32 microns, and, a is in the range of about 25 to 35 microns.

10. The single mode waveguide fiber of claim 9 wherein said alpha profile first segment has an associate effective index profile of trapezoidal shape, wherein, beginning at the waveguide centerline and proceeding outward, the trapezoidal shape has a horizontal portion of radial extent in the range of about 1 to 3 microns and an adjoining straight line sloped portion, and $\Delta_1\%$ is essentially unchanged and $a_o$ is the range of about 1.5 to 4.5.

11. The single mode waveguide fiber of claim 9 wherein said alpha profile has a central refractive index depression in the shape of an inverted cone, the radius of the circular base of the cone having a radius in the range 0.10 to 1.0 microns.

12. The single mode waveguide fiber of claim 9 wherein $\Delta_o\%$ is in the range of about 0.65% to 1.0% and $a_o$ in the range of about 2.8 to 3.5 microns, the second said core segment having a $\Delta_1\%$ less than about –0.10%, and $a_1$ in the range of about 6 to 8 microns, the third said core segment having a $\Delta_2\%$ in the range of about 0.50% to 0.85%, and $a_2$ in the range of about 8 to 10 microns, said fourth core segment having a $\Delta_3\%$ less than about –0.10%, and $a_3$ in the range of about 13 to 16 microns, and, a is about equal to $a_3$.

13. The single mode waveguide fiber of claim 9 wherein alpha is in the range 1 to 6.

14. The single mode optical waveguide fiber of claim 1 wherein said core region refractive index profile is sub-divided into five segments and the minimum refractive index of three, non-adjacent segments is less than the minimum refractive index of said clad layer, and the last point, with respect to the zero reference point on the waveguide fiber centerline, in each said core refractive index profile segment is defined as a radius, $a_o$, $a_1$, $a_2$, $a_3$, and a, respectively, wherein a is the radius of said core.

15. The single mode optical waveguide fiber of claim 14 wherein the segments of said core are characterized by an index $\Delta\%$, $\Delta_o\%$, $\%\Delta_1$ $\Delta_2\%$, $\Delta_3\%$, and $\Delta_4\%$, respectively, the first said core segment having $\Delta_o\%$ less than about $-0.10\%$, and $a_o$ in the range of about 0.1 to 2.5 microns, the second said core segment having $\Delta_1\%$ in the range of about 0.50% to 1.2%, and $a_1$ in the range of about 0.5 to 4.5 microns, the third said core segment having $\Delta_2\%$ less than about $-0.1\%$, and $a_2$ in the range of about 6 to 12 microns, the fourth said core segment having $\Delta_3\%$ in the range of about 0.2% to 0.8%, and $a_3$ in the range of about 7 to 14 microns, the fifth said core segment having a $\Delta_4\%$ less than about $-0.1\%$, and $a_4$ in the range of about 13 to 30 microns, and, the core radius, a, in the range of about 20 to 35 microns.

16. The single mode optical waveguide fiber of claim 1 wherein bending loss induced by forming one turn of said optical waveguide about a 32 mm diameter mandrel is $\leq 0.05$ dB at 1550 nm, and bending loss induced by forming 100 turns of said optical waveguide about a 75 mm mandrel is, $\leq 0.05$ dB at 1310 nm, and $\leq 0.10$ dB at 1550 nm, respectively.

17. A single mode optical waveguide fiber, comprising:

a core region having a refractive index profile, wherein the refractive index profile of said core is sub-divided into at least three segments; and, a clad layer having a refractive index profile and a refractive index minimum, wherein at least a portion of said core refractive index profile is greater than at least a portion of said clad layer profile and at least one segment of said core index profile has a minimum refractive index less than the minimum refractive index of said clad layer;

said single mode optical waveguide fiber having an electric field intensity weighted by radius wherein said weighted electric field intensity is bimodal.

18. The single mode optical waveguide fiber of claim 17 wherein said bimodal weighted field intensity has at least two distinct maxima.

19. The single mode optical waveguide fiber of claim 17 wherein bending loss induced by forming one turn of said optical waveguide about a 32 mm diameter mandrel is $\leq 0.05$ dB at 1550 nm, and bending loss induced by forming 100 turns of said optical waveguide about a 75 mm mandrel is, $\leq 0.05$ dB at 1310 nm, and $\leq 0.10$ dB at 1550 nm, respectively.

* * * * *

UNITED STATES PATENT AND TRADEMARK OFFICE
CERTIFICATE OF CORRECTION

PATENT NO.    : 5,781,684
DATED         : July 14, 1998
INVENTOR(S)   : Yanming Liu Page 1 of 1

It is certified that error appears in the above-identified patent and that said Letters Patent is hereby corrected as shown below:

<u>Column 1,</u>
Line 3, Following the title and prior to "BACKGROUND", please insert the following:

-- RELATED APPLICATION

This patent claims priority to, and the benefit of, U.S. Provisonal Patent Application Serial Number 60/006,561, filed February 12, 1996. --

Signed and Sealed this

Eighteenth Day of September, 2001

Attest:

*Nicholas P. Godici*

NICHOLAS P. GODICI
*Attesting Officer*    *Acting Director of the United States Patent and Trademark Office*